No. 718,531. PATENTED JAN. 13, 1903.
A. W. SANDELL.
SPEED REGULATING AND CONTROLLING MECHANISM FOR SELF PROPELLED VEHICLES.
APPLICATION FILED MAR. 21, 1901.
NO MODEL.
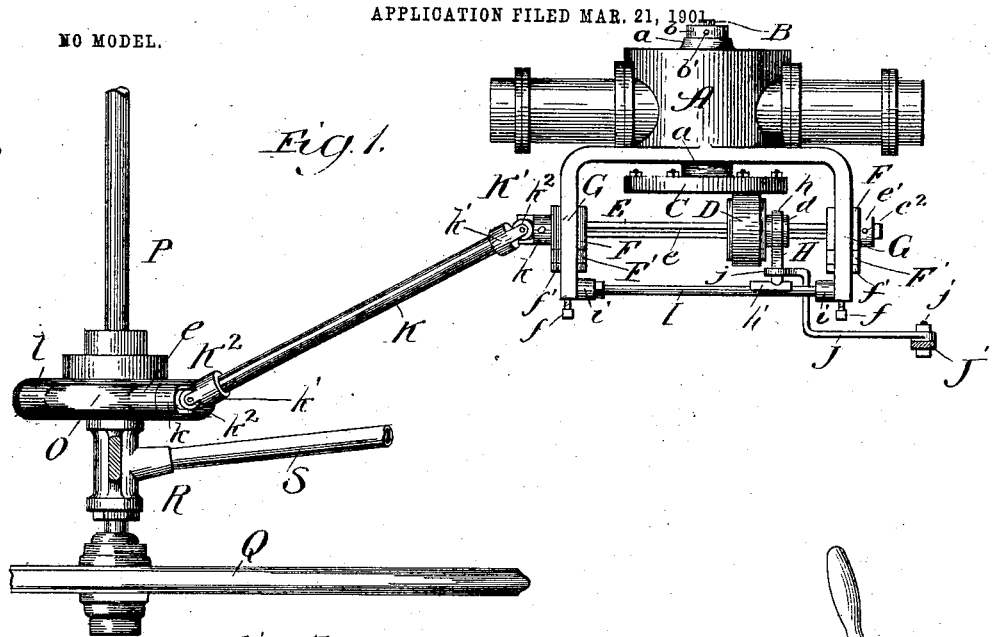
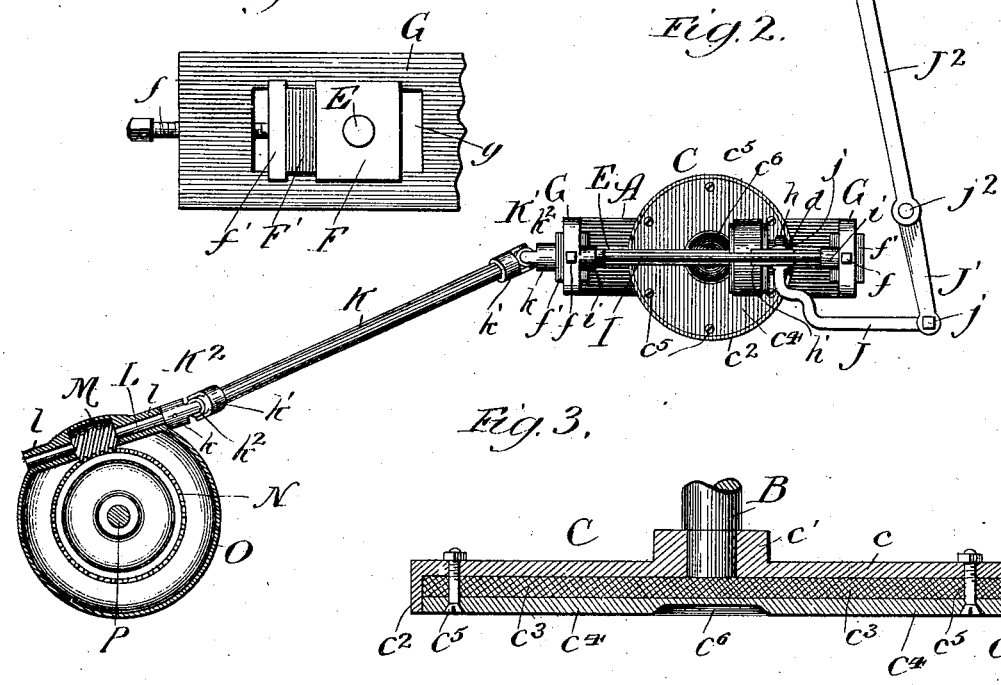
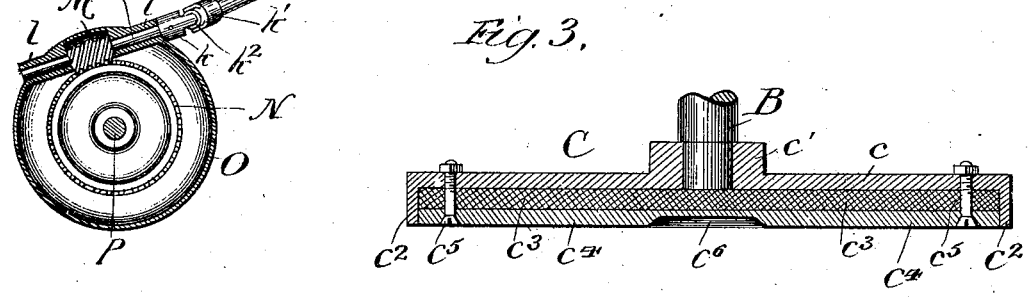
Witnesses:
Inventor:
Axel W. Sandell,
By Banning & Banning
Attys

UNITED STATES PATENT OFFICE.

AXEL W. SANDELL, OF CHICAGO, ILLINOIS, ASSIGNOR OF ONE-HALF TO JACOB LAUTH, OF CHICAGO, ILLINOIS.

SPEED REGULATING AND CONTROLLING MECHANISM FOR SELF-PROPELLED VEHICLES.

SPECIFICATION forming part of Letters Patent No. 718,531, dated January 13, 1903.

Application filed March 21, 1901. Serial No. 52,186. (No model.)

*To all whom it may concern:*

Be it known that I, AXEL W. SANDELL, a citizen of the United States, and a resident of Chicago, in the county of Cook and State of Illinois, have invented a certain new and useful Improvement in Speed Regulating and Controlling Mechanism for Self-Propelled Vehicles, of which the following is a specification.

The object of my invention is to construct a mechanism for application to and use with a self-propelled vehicle by means of which the speed can be regulated and controlled by the operator from no speed up to the highest speed obtainable from the driving engine or motor and have the mechanism of simple construction and well adapted for the purpose intended and efficient, reliable, and positive in use; and the invention consists in the features of construction and combination of parts hereinafter described and claimed.

In the drawings illustrating the invention, Figure 1 is a plan view showing the engine or motor and a portion of a rear axle and wheel with the power-transmitting devices and the regulating and controlling mechanism for the speed; Fig. 2, a side elevation of the parts shown in Fig. 1 with the wheel removed and the axle in section; Fig. 3, an enlarged sectional elevation of the power-transmitting disk or wheel driven from the engine or motor; and Fig. 4, a detail, being an elevation showing a portion of the frame carrying the power-shaft for operating the driving-gear for the axle.

In the drawings only so much of a self-propelled vehicle or automobile is shown as is deemed necessary for the purpose of illustrating the mechanism which pertains particularly to the invention, and for this reason one end of the driven axle with a carrying-wheel, partly broken away, is shown, while the running-gear and the body of the vehicle or automobile is omitted, it being understood that the driving engine or motor is carried by the body in any usual and well-known manner.

The engine or motor A can be a gas or other form of engine or motor adapted for use in a self-propelled vehicle. The engine shown has a shaft B extending laterally through the engine at the center, and, as shown, the engine on each side has bearings or boxes $a$ for supporting the shaft, and the shaft is held in place by a collar or ring $b$ and a set screw or pin $b'$ on one end of the shaft, the collar abutting against the end face of the bearings or boxes $a$ for the shaft.

The shaft at the opposite end to the collar $b$ has secured thereon a driving-disk C, so as to be revolved with the shaft, and, as shown, the disk has a hub or center $c'$, which abuts against the end of the bearing or box for the shaft. The driving-disk C is formed of a metal plate $c$, having the projecting hub or center $c'$ for attachment to the driving-shaft and having a circumferential or peripheral rim $c^2$, forming a chamber within the rim, in which chamber is located a packing or cushion $c^3$, of paper or other suitable semicompressible and elastic material, and the acting face of the driving-disk is formed of a plate of hardened metal $c^4$, entered within the peripheral rim against the packing or cushion, and as shown, the packing or cushion and the face-plate of hardened metal are united to the backing-plate by suitable bolts $c^5$, passing through the sections of the driving-disk as a whole. The hardened face-plate $c^4$ at the axial center of the disk has a countersink or depression $c^6$ of a diameter and depth sufficient to clear the driving-disk of the driven pinion or disk when the pinion or disk is at the center of the driving-disk.

The driven pinion or disk D is of less diameter than the diameter of the driving-disk and is located adjacent to the driving-disk, so that its peripheral face will bear against and impinge on the hardened plate of the driving-disk with sufficient force to impart rotation to the driven pinion or disk from the rotation of the driving-disk. The driven pinion or disk D is slidably mounted on a driven shaft E by means of a spline or key on the pinion, which enters a longitudinal groove or slot $e$ in the shaft, locking the pinion or disk to the shaft, so that the pinion or disk can be moved forward and back on the shaft and at the same time impart rotation to the shaft. The moving of the pinion or disk D on the driven shaft in or out in relation to the center of the driving-disk decreases or increases the speed at which the driven pinion or disk is revolved, and with the pinion or disk in line with the axial center of the driving-disk its periphery will clear the hardened face of the driving-disk by reason of the countersink or depression $c^6$, so that with the rotation of the driving-disk no movement will be transmitted to the driven pinion or disk. As the driven pinion or disk is moved out or toward the periphery of the driving-disk it will have an increased speed proportionately given thereto between the limit of adjustment from the center outward of the driving-disk, owing to the increased bearing surface brought into engagement with the periphery of the driven pinion or disk, the outward movement of the pinion or disk, in effect, giving an increased diameter of driving-surface, and consequently an increase of speed, for the driven pinion or disk.

The driven shaft E is mounted in adjustable journal boxes or bearings F, located in a frame or support attached to the engine, so that the driven shaft will be in axial line with the center of the driving-disk. Each box F is mounted in an elongated slot $g$ in the end arms or pieces of the frame or support G, and each box has adjacent thereto a cushion or packing F', of rubber or other elastic material which will yield under pressure and exert a spring action, by which the driven pinion or disk will be held properly in contact with the acting face of the driving-disk. Each spring or cushion F' is carried by a follower-plate $f'$, against which the end of an adjusting-screw $f$, passing through the end of the end arm or piece of the frame or support, abuts, so that by advancing the screw the proper tension can be placed on the spring or cushion to regulate the contact and impingement of the driven pinion or disk against the acting face of the driving-disk, so as to insure the driving of the pinion or disk to revolve the driven shaft at the speed desired.

The driven pinion or disk D has a prolonged hub or center $d$, which is engaged by a fork $h$ of an arm H, and the lower end of the arm has thereon a shoe or slide $h'$, which rides or travels on a supporting track or rod I, secured in bosses $i$ on the inside of the end arms or pieces of the frame or support, so that the arm or bar H will travel in a straight line or plane in moving the pinion or disk inward or outward for regulating and controlling the speed.

The sliding arm or bar H is encircled by an eye or loop $j$ at the end of a connecting-bar J, the other end of which connecting-bar is attached by a pivot $j'$ to the lower end J' of an arm or lever $J^2$, pivoted by a suitable pin or pivot $j^2$, so as to be within reach of the operator of the machine. The movement of the lever $J^2$ by the operator moves the connecting-bar J inward or outward for such movements of the connecting-bar to correspondingly move the forked arm or bar H and travel the driven pinion or disk inward or outward in relation to its point of bearing on the driving-disk. It will thus be seen that the control of the position of the driven pinion or disk in relation to its bearing on the driving-disk is under the direction of the operator, who by moving the lever $J^2$ can adjust the position of the driven pinion or disk properly to regulate the speed for the driven shaft as required or desired.

The driven shaft at one end is held against endwise movement of the shaft by a collar $e'$, which abuts against the end face of a journal box or bearing and a set screw or pin $e^2$, locking the collar to the shaft end, and the other end of the shaft has attached thereto by a suitable set screw or pin one section $k$ of a universal joint K'. The universal joint K' has its other section $k'$ attached to the end of a driving-shaft K, and the other end of the driving-shaft is connected with one section $k'$ of a universal joint $K^2$, which connects with a worm-shaft. The universal joints K' and $K^2$ are of similar construction, and each is formed of connecting forks or sections $k$ and $k'$ and an interposed ball $k^2$, pivotally connected with the forks or sections, as is common in the construction of universal joints. The section or fork $k$ of the universal joint $K^2$ is attached to the end of a shaft L, mounted in bearings $l$ of a shell or casing surrounding the driven gear on the axle, and this shaft L carries a worm-gear M, which meshes with the driven gear N on the axle P, which may be the rear axle of the machine, and, as shown, the driven gear N is surrounded or incased in a shell or casing O, mounted on the axle. The axle has at its end a carrying-wheel Q, and, as shown, adjacent to the axle is a box R, extending out from which is a side bar S of the running-gear. The driving-gear for the axle, the axle, the wheel, and the running-gear are not specifically described, as they may be of any well-known form of construction so long as the gear for the axle is one that can be driven from the driving-shaft K through the driven shaft E from the driving-disks.

The operation is as follows: With the driven pinion or disk in line with the axial center of the driving-disk and projected into the countersink or depression $c^6$ the operation of the engine or motor will not transmit power to the driven pinion or disk, as the driving-disk runs clear of the driven pinion or disk. This enables the operator to stop the travel of the machine without interfering with the operation of the engine or motor, which continues to run without driving the machine, so that with the machine at rest it is not necessary to shut down the engine or motor unless so desired, as the engine or motor with the friction-driven pinion or disk at the axial center of the driving friction-disk will not drive the pinion or disk. The movement of the lever $J^2$ by the operator in a direction to move the lower end of the lever outward moves the connecting-bar J outward and through the fork-bar slides the friction-driven pinion or disk on the driven shaft E outward, bringing the periphery of the friction pinion or disk in contact with the friction driving-disk, so that the rotation of the driving-disk will revolve the driven pinion or disk, and the rapidity of the revolution given to the driven pinion or disk will depend upon the relation of the pinion or disk to the center of the driving-disk. The farther removed from the center the greater will be the speed given to the driven pinion or disk, and consequently the greater speed for the driven shaft, and the nearer to the center of the driving-disk the less will be the speed given to the driven pinion or disk, and consequently to the driven shaft. The driven shaft E, through its connection by the universal joint K' with the driving-shaft K, rotates such shaft, and the shaft K, through its connection by the universal joint $K^2$ with the driven shaft L, drives the gear for moving the vehicle or automobile, and inasmuch as the speed of the shaft E controls the speed of the parts driven therefrom it will be seen that the speed at which the vehicle or automobile travels or runs is controlled by the relation of the friction-driven pinion or disk to the friction driving-disk, and such relation is regulated by the operator by simply moving the controlling-lever therefor. The mechanism is very simple and in use will be found efficient and reliable. The location of the friction-disks in relation one to the other is easily changed, as may be desired, by the operator. The requisite amount of bearing or contact for the friction-disks is regulated by the sliding journal boxes or bearings and the adjusting-screws therefor. The wear in use is compensated for by means of the sliding boxes or bearings and the regulating-screws, by which the boxes or bearings can be advanced to take up wear between the friction-disks, and the mechanism as a whole having but few parts is not liable to become injured or damaged or rendered inoperative in use.

What I claim as new, and desire to secure by Letters Patent, is—

1. In a speed controlling and regulating mechanism, the combination of a power-shaft, a driving-disk on the end of the power-shaft consisting of a backing plate, an intermediate cushion-plate and a hardened metallic plate forming the acting face of the disk and having therein an axial depression, a driven gear or disk adjustable toward and from the center of the driving-disk, and means for moving the driven gear or disk, substantially as described.

2. In a speed controlling and regulating mechanism, the combination of a power-shaft, a driving-disk on the end of the power-shaft having an axial depression in its acting face, a driven gear or disk adjustable toward and from the center of the driving-disk, a driven shaft on which the driven gear or disk is slidably mounted, adjustable journal boxes or bearings in which the driven shaft is mounted at its ends, a frame carrying the adjustable journal-boxes, a cushion for each journal-box, a forked arm engaging the driven gear or disk, a guide-rod supporting the outer end of the forked arm, and a connecting-rod and lever for moving the forked arm and changing the relation of the driven gear or disk to the driving-disk, substantially as described.

3. In a speed controlling and regulating mechanism, the combination of a power-shaft, a driving-disk on the end of the power-shaft, having an axial depression in its acting face, a driven gear or disk adjustable toward and from the center of the driving-disk, a driven shaft on which the driven gear or disk is slidably mounted, adjustable journal boxes or bearings in which the driven shaft is mounted, cushioning-blocks engaging the journal boxes or bearings, adjusting-screws engaging the cushioning-blocks, and means for moving the driven gear or disk on the driven shaft toward and from the center of the driving-disk, substantially as described.

4. In a speed controlling and regulating mechanism, the combination of a power-shaft, a driving-disk on the end of the power-shaft having an axial depression in its acting face, a driven gear or disk adjustable toward and from the center of the driving-disk, a driven shaft on which the driving gear or disk is slidably mounted, adjustable journal-boxes in which the driven shaft is mounted, a cushion for each journal-box, a frame carrying the journal-boxes and cushions, an adjusting-screw on the frame for each journal-box and cushion, a forked arm engaging the driven gear or disk, a guide-rod supporting the outer end of the forked arm, and a connecting-rod and lever for moving the forked arm and changing the relation of the driven gear or disk to the driving-disk, substantially as described.

5. In a speed controlling and regulating mechanism, the combination of a power-shaft, a driving-disk on the end of the power-shaft having an axial depression on its acting face, a driven gear or disk adjustable toward and from the center of the driving-disk, a driven shaft on which the driven gear or disk is slidably mounted, adjustable cushioned journal-boxes in which the driven shaft is mounted, a frame carrying the journal-boxes, a forked arm engaging the driven gear or disk, a guide-rod supporting the outer end of the forked arm, a connecting-rod and lever for moving the forked arm and changing the relation of the driven gear or disk to the driving-disk, and a connection between the driving-shaft and the part to be driven therefrom, substantially as described.

6. In a speed controlling and regulating mechanism, the combination of a power-shaft, a driving-disk on the end of the power-shaft having an axial depression on its acting face, a driven gear or disk adjustable toward and from the center of the driving-disk, a driven shaft on which the driven gear or disk is slidably mounted, adjustable cushioned journal-boxes in which the driven shaft is mounted, a frame carrying the journal-boxes, a forked arm engaging the driven gear or disk, a guide-rod supporting the outer end of the forked arm, a connecting-rod and lever for moving the forked arm and changing the relation of the driven gear or disk to the driving-disk, and a connection having universal joints for transmitting power from the driven shaft to the mechanism to be driven, substantially as described.

AXEL W. SANDELL.

Witnesses:
A. LAUTH,
THOMAS B. MCGREGOR.